US012656555B2

(12) United States Patent (10) Patent No.: US 12,656,555 B2

Cui et al. (45) Date of Patent: Jun. 16, 2026

(54) COMBINABLE OPTICAL-FIBER ADAPTER ASSEMBLY

(71) Applicant: ACON OPTICS COMMUNICATIONS INC., New Taipei City (TW)

(72) Inventors: Yang-Yang Cui, New Taipei City (TW); Rui Zhang, New Taipei City (TW)

(73) Assignee: ACON OPTICS COMMUNICATIONS INC., New Taipei City (TW)

( * ) Notice: Subject to any disclaimer, the term of this patent is extended or adjusted under 35 U.S.C. 154(b) by 427 days.

(21) Appl. No.: 18/329,022

(22) Filed: Jun. 5, 2023

(65) Prior Publication Data

US 2023/0400640 A1 Dec. 14, 2023

(30) Foreign Application Priority Data

Jun. 9, 2022 (CN) .......................... 202221422828.2
Apr. 19, 2023 (CN) .......................... 202310422704.7

(51) Int. Cl.
G02B 6/38 (2006.01)

(52) U.S. Cl.
CPC ................................. G02B 6/3825 (2013.01)

(58) Field of Classification Search
CPC . G02B 6/3825; G02B 6/3897; G02B 6/44528
See application file for complete search history.

(56) References Cited

U.S. PATENT DOCUMENTS

| | | | |
|---|---|---|---|
| 6,375,517 B1 * | 4/2002 | Okabe .................. | H01R 13/514 |
| | | | 439/594 |
| 2014/0334780 A1 | 11/2014 | Nguyen et al. | |
| 2015/0205060 A1 | 7/2015 | Chen et al. | |
| 2016/0011383 A1 | 1/2016 | Lee et al. | |
| 2016/0356966 A1 | 12/2016 | Lin et al. | |
| 2018/0329152 A1 | 11/2018 | Verheyden | |
| 2020/0003966 A1 | 1/2020 | Hsu et al. | |

FOREIGN PATENT DOCUMENTS

| | | |
|---|---|---|
| CN | 216083178 U | 3/2022 |
| WO | 2013179197 A1 | 12/2013 |

* cited by examiner

*Primary Examiner* — John Bedtelyon
(74) *Attorney, Agent, or Firm* — INNOVATION CAPITAL LAW GROUP, LLP; Vic Lin

(57) ABSTRACT

A combinable optical-fiber adapter assembly includes combinable optical-fiber adapters. A first optical-fiber adapter of the adapters has first connection units. A second optical-fiber adapter of the adapters has second connection units. The first connection units are assembled with the second connection units. In a one-to-one manner, the first connection unit on the front portion of the outer side surface of the first adapter body is docked with the second connection unit on the front portion of the outer side surface of the second adapter body adjacent to the first adapter body, and the first connection unit on the rear portion of the outer side surface of the first adapter body is docked with the second connection unit on the rear portion of the outer side surface of the second adapter body adjacent to the first adapter body, so that two adjacent optical-fiber adapters can be assembled side-by-side.

16 Claims, 9 Drawing Sheets

COMBINABLE OPTICAL-FIBER ADAPTER ASSEMBLY

CROSS-REFERENCE TO RELATED APPLICATION

This non-provisional application claims priority under 35 U.S.C. § 119(a) to Patent Application No. 202221422828.2 filed in China, P.R.C. on Jun. 9, 2022 and Patent Application No. 202310422704.7 filed in China, P.R.C. on Apr. 19, 2023, the entire contents of which are hereby incorporated by reference.

FIELD OF THE INVENTION

The instant disclosure relates to a combinable optical-fiber adapter, and more particular to a combinable optical-fiber adapter assembly.

BACKGROUND

A lucent connector (LC) type optical-fiber adapter is an optical transmission connector for connections of LC-type optical-fiber cables so as to transmit optical signals. However, for an LC-type adapter known to the inventor, the number of the holes of the LC-type adapter for the insertion of connectors is fixed (which may be one, two, four, or the like). As a result, the adapter fails to provide flexible layout configurations for the optical-fiber cables, and thus the layout space is wasted.

SUMMARY OF THE INVENTION

In view of these, one or some embodiments of the instant disclosure provide a combinable optical-fiber adapter assembly that allows flexible layout configurations for the optical-fiber cables, thereby preventing wastage of the layout space.

According to some embodiments, a combinable optical-fiber adapter assembly is provided and comprises a first optical-fiber adapter and a second optical-fiber adapter. The first optical-fiber adapter comprises a first adapter body, four side walls of the first adapter body define a first receiving cavity, two ends of the first adapter body have first insertion openings in communication with the first receiving cavity, a first side wall of the first adapter body has a plurality of first connection units, and the first side wall of the first adapter body comprises a first connection front portion and a first connection rear portion. The first connection units has a first recess at the first connection front portion and a first protrusion at the first connection rear portion, or the first connection units have a second protrusion at the first connection front portion and a second recess at the first connection rear portion. The second optical-fiber adapter comprises a second adapter body, four side walls of the second adapter body define a second receiving cavity, two ends of the second adapter body have second insertion openings in communication with the second receiving cavity, a first side wall of the second adapter body has a plurality of second connection units, and the first side wall of the second adapter body comprises a second connection front portion and a second connection rear portion. The second connection units have a third protrusion at the second connection front portion and a third recess at the second connection rear portion, or the second connection units have a fourth recess at the second connection front portion and a fourth protrusion at the second connection rear portion.

The first recess at the first connection front portion of the first adapter body is docked with the third protrusion at the second connection front portion of the second adapter body which is adjacent to the first recess in a one-to-one manner, and the first protrusion at the first connection rear portion of the first adapter body is docked with the third recess at the second connection rear portion of the second adapter body which is adjacent to the first protrusion in a one-to-one manner, so that the first adapter body and the second adapter body adjacent to the first adapter body are assembled with each other side-by-side. Or, the second protrusion at the first connection front portion of the first adapter body is docked with the fourth recess at the second connection front portion of the second adapter body which is adjacent to the second protrusion in a one-to-one manner, and the second recess at the first connection rear portion of the first adapter body is docked with the fourth protrusion at the second connection rear portion of the second adapter body which is adjacent to the second recess in a one-to-one manner, so that the first adapter body and the second adapter body adjacent to the first adapter body are assembled with each other side-by-side.

In some embodiments, each of the first connection units is on the first side wall of the first adapter body along an axial direction, the axial direction is perpendicular to an insertion direction of the first receiving cavity, each of the second connection units is on the first side wall of the second adapter body along the axial direction, and the axial direction is perpendicular to an insertion direction of the second receiving cavity.

In some embodiments, the first connection units extend from a side portion of a first blocking wall of the first adapter body to a side portion of a first combining base wall of the first adapter body, and the second connection units extend from a side portion of a second blocking wall of the second adapter body to a side portion of a second combining base wall of the second adapter body.

In some embodiments, the first side wall of the first adapter body has a first engaging portion, the first side wall of the second adapter body has a second engaging portion, and the first engaging portion is assembled with the second engaging portion.

In some embodiments, the first connection units are on two side portions of the first side wall of the first adapter body, the first engaging portion is between the first connection units, the second connection units are on two side portions of the first side wall of the second adapter body, and the second engaging portion is between the second connection units.

In some embodiments, the first engaging portion is adjacent to one of the first connection units, and the second engaging portion is adjacent to one of the second connection units.

In some embodiments, the first engaging portion has a groove and an insertion hole, each of two sides of the insertion hole has a buckling portion, the second engaging portion has a protruding block, the protruding block is engaged with the groove through the insertion hole, and each of the buckling portions contacts the protruding block and is limited by the protruding block.

In some embodiments, the first engaging portion is between the first side wall of the first adapter body and the first blocking wall of the first adapter body, and the second engaging portion is between the first side wall of the second adapter body and the second blocking wall of the second adapter body.

In some embodiments, the first blocking wall of the first adapter body is flush with the second blocking wall of the second adapter body, and a first combining base wall of the first adapter body is flush with a second combining base wall of the second adapter body.

In some embodiments, the first engaging portion is between the first side wall of the first adapter body and a first combining base wall of the first adapter body, and the second engaging portion is between the first side wall of the second adapter body and a second combining base wall of the second adapter body.

In some embodiments, a second side wall of the second adapter body and the first side wall of the second adapter body are symmetrically arranged at two sides of the second adapter body, the second side wall of the second adapter body has a plurality of third connection units and a third engaging portion; the combinable optical-fiber adapter assembly further comprises a third optical-fiber adapter, the third optical-fiber adapter comprises a third adapter body, four side walls of the third adapter body define a third receiving cavity, two ends of the third adapter body have third insertion openings in communication with the third receiving cavity, and a first side wall of the third adapter body has a plurality of fourth connection units and a fourth engaging portion; each of the third connection units is assembled with a corresponding one of the fourth connection units, and the third engaging portion is assembled with the fourth engaging portion.

In some embodiments, the second connection units at a front portion and a rear portion of the first side wall of the second adapter body respectively correspond to the third connection units at a front portion and a rear portion of the second side wall of the second adapter body.

In some embodiments, two ends of the first optical-fiber adapter have a first inserting end and a first assembling end, the first connection front portion is connected to the first inserting end, the first connection rear portion is connected to the first assembling end, two ends of the second optical-fiber adapter have a second inserting end and a second assembling end, the second connection front portion is connected to the second inserting end, and the second connection rear portion is connected to the second assembling end.

In some embodiments, the four side walls of the first adapter body are the first side wall, a second side wall, a first blocking wall, and a first combining base wall; the first side wall and the second side wall of the first adapter body respectively extend from two sides of the first combining base wall toward a same direction away from the first combining base wall, the first blocking wall is connected to the first side wall and the second side wall, and the first blocking wall is spaced apart from the first combining base wall.

In some embodiments, the four side walls of the second adapter body are the first side wall, a second side wall, a second blocking wall, and a second combining base wall; the first side wall and the second side wall of the second adapter body respectively extend from two sides of the second combining base wall toward a same direction away from the second combining base wall, the second blocking wall is connected to the first side wall and the second side wall, and the second blocking wall is spaced apart from the second combining base wall.

In some embodiments, a width of the first recess is greater than or equal to a width of the third protrusion, and a width of the first protrusion is less than or equal to a width of the third recess.

In some embodiments, a width of the second protrusion is less than or equal to a width of the fourth recess, and a width of the second recess is greater than or equal to a width of the fourth protrusion.

According to some embodiments, a combinable optical-fiber adapter assembly is provided and comprises a first optical-fiber adapter and a second optical-fiber adapter. The first optical-fiber adapter comprises a first adapter body, four side walls of the first adapter body define a first receiving cavity, two ends of the first adapter body have first insertion openings in communication with the first receiving cavity, and a first side wall of the first adapter body has a plurality of first connection units and a first engaging portion. The second optical-fiber adapter comprises a second adapter body, four side walls of the second adapter body define a second receiving cavity, two ends of the second adapter body define a second receiving cavity, two ends of the second adapter body have second insertion openings in communication with the second receiving cavity, and a first side wall of the second adapter body has a plurality of second connection units and a second engaging portion. Each of the first connection units is assembled with a corresponding one of the second connection units, and the first engaging portion is assembled with the second engaging portion.

According to some embodiments of the instant disclosure, the first connection unit on the front portion of the outer side surface of the first adapter body is docked with the second connection unit on the front portion of the outer side surface of the second adapter body which is adjacent to the first adapter body in a one-to-one manner, and the first connection unit on the rear portion of the outer side surface of the first adapter body is docked with the second connection unit on the rear portion of the outer side surface of the second adapter body which is adjacent to the first adapter body in a one-to-one manner, so that two adjacent optical-fiber adapters can be assembled with each other side-by-side, and the two first connection units are respectively docked with the two second connection units, thereby preventing the first connection unit on the front portion of the outer side surface of the first adapter body from being docked with the second connection unit on the rear portion of the outer side surface of the second adapter body which is adjacent to the first adapter body, and preventing the first connection unit on the rear portion of the outer side surface of the first adapter body from being docked with the second connection unit on the front portion of the outer side surface of the second adapter body which is adjacent to the first adapter body. By arranging several optical-fiber adapters side by side and interconnecting the optical-fiber adapters with each other, the optical-fiber adapters allow the insertion of several optical-fiber connectors, so that the adapters can provide flexible layout configurations for the optical-fiber cables. According to some embodiments, through the fixation between the first connection units and the second connection units and the fixation between the first engaging portion and the second engaging portion, the connecting side walls of the optical-fiber adapters do not detach from each other by the downward pulling force of the optical-fiber cables.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

Figure 1:
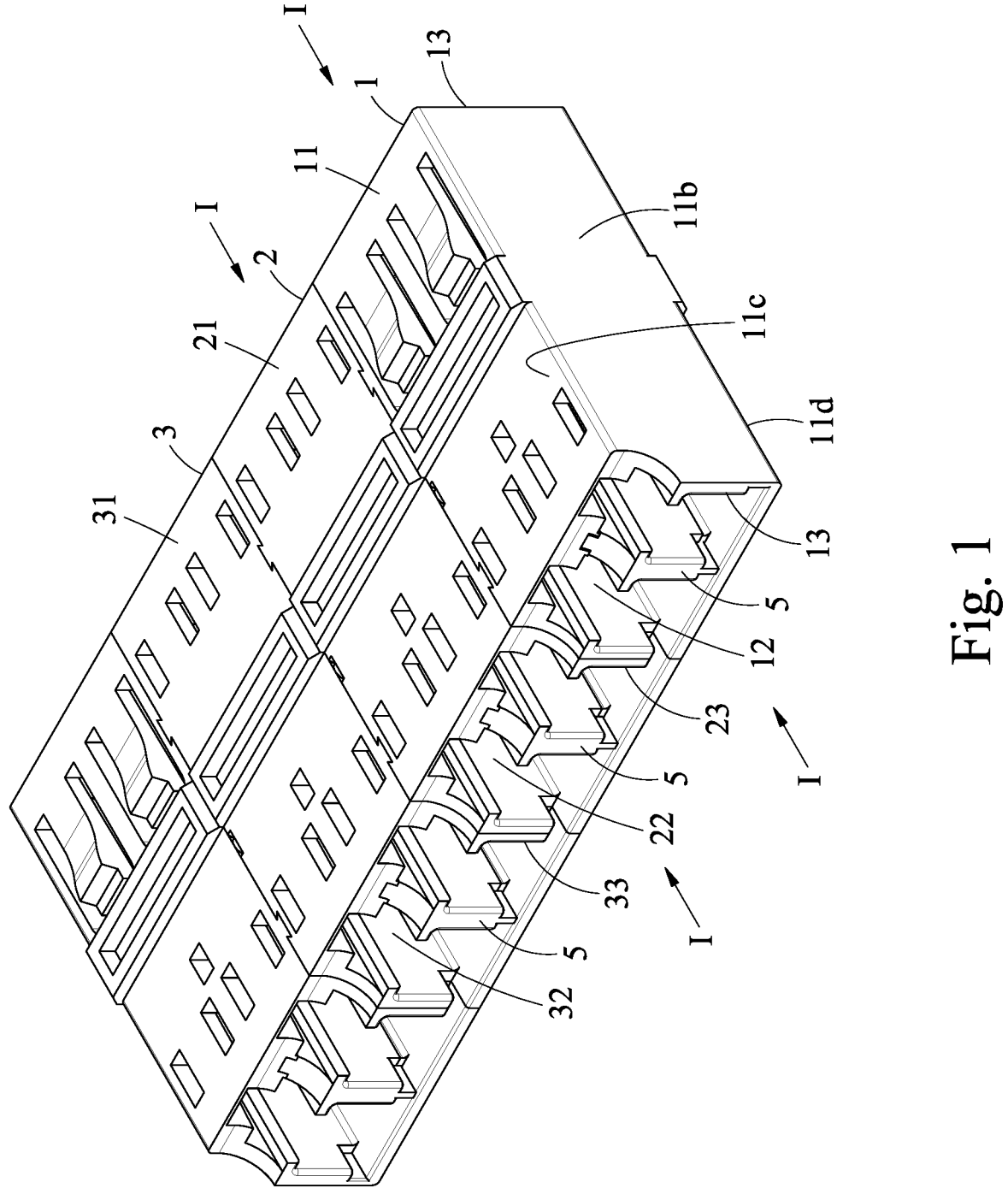
FIG. 1 illustrates a perspective view of an optical-fiber adapter assembly according to some embodiments of the instant disclosure.
Figure 2:
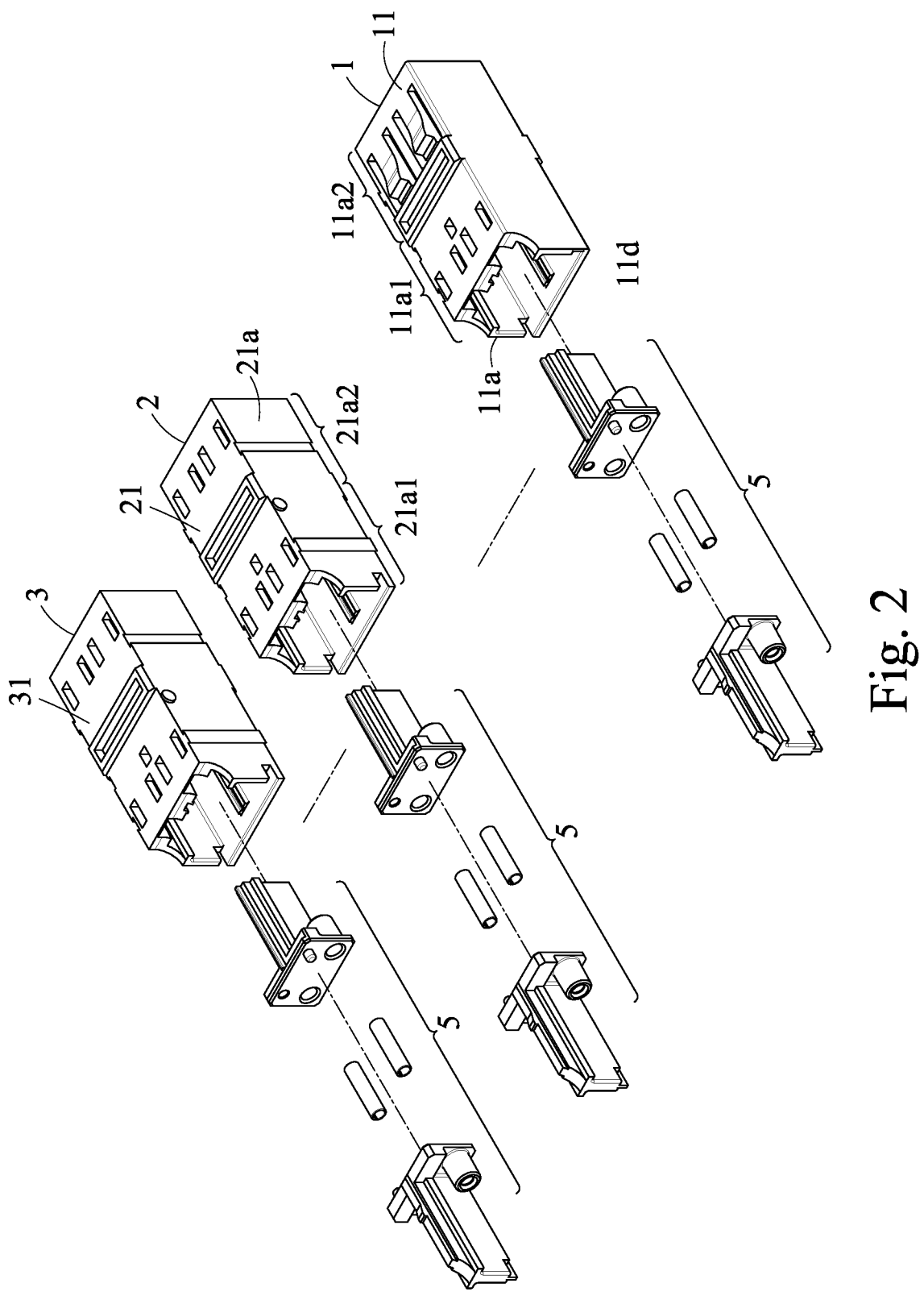
FIG. 2 illustrates an exploded view of the optical-fiber adapter assembly according to some embodiments of the instant disclosure, where the exploded view of the base assembly is illustrated.
Figure 3:
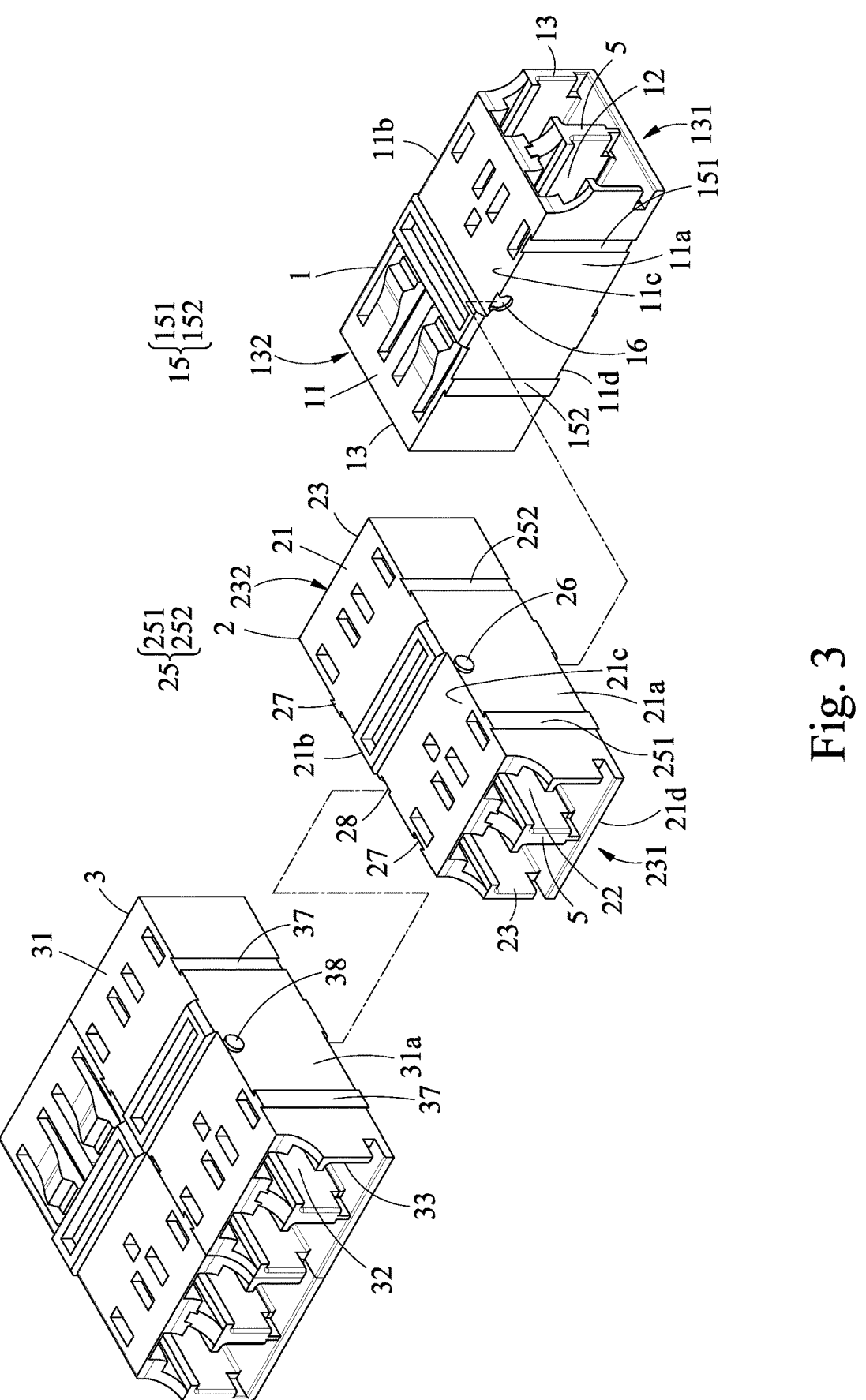
FIG. 3 illustrates an exploded view of the optical-fiber adapter assembly according to some embodiments of the instant disclosure.

Please refer to FIG. 1 to FIG. 3. FIG. 1 illustrates a perspective view of an optical-fiber adapter assembly. FIG. 2 illustrates an exploded view of the optical-fiber adapter assembly, where the exploded view of the base assembly 5 is illustrated. FIG. 3 illustrates an exploded view of the optical-fiber adapter assembly. In some embodiments, the optical-fiber adapter assembly is provided for the insertion of a plurality of optical-fiber connectors. The optical-fiber connectors (in this embodiment, lucent connectors (LC connectors)) are provided for applications in cabinets in which the connectors are densely arranged. The optical-fiber adapter assembly comprises a plurality of optical-fiber adapters arranged side by side and interconnected with each other. In the following descriptions, as an illustrative example, the optical-fiber adapter assembly comprises a first optical-fiber adapter 1 and a second optical-fiber adapter 2. Each of the first optical-fiber adapter 1 and the second optical-fiber adapter 2 has a base assembly 5 therein.

Figure 9:
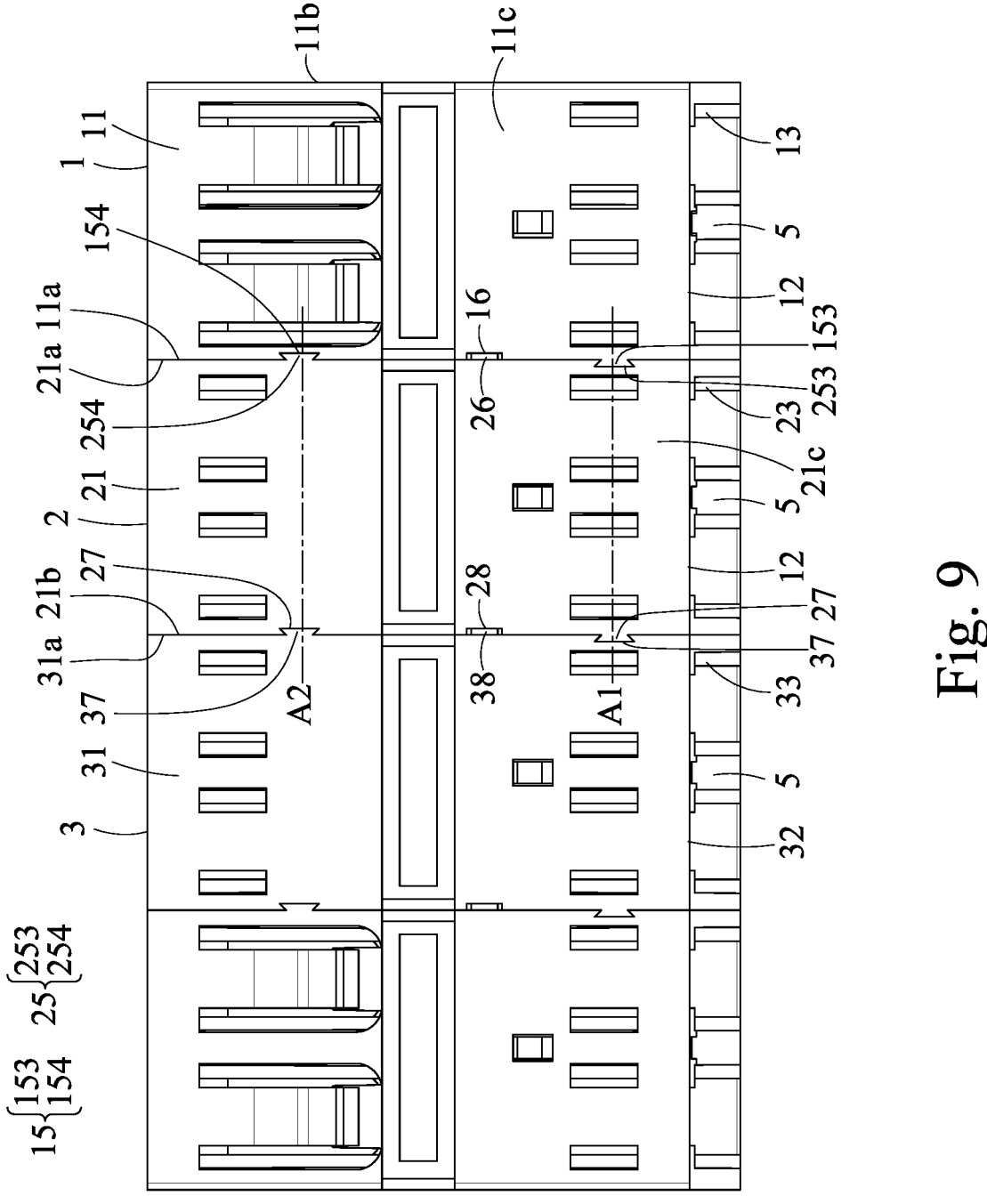
FIG. 9 illustrates a top view of the optical-fiber adapter assembly according to some embodiments of the instant disclosure, where the second protrusion at the first connection front portion is mated with the fourth protrusion at the second connection front portion, and the first protrusion at the first connection rear portion is mated with the third recess at the second connection rear portion.

The first optical-fiber adapter 1 comprises a first adapter body 11, and four side walls of the first adapter body 11 define a first receiving cavity 12. Two ends of the first adapter body 11 have first insertion openings 13 in communication with the first receiving cavity 12. The first side wall 11$a$ of the first adapter body 11 has a plurality of first connection units 15. The first side wall 11$a$ of the first adapter body 11 comprises a first connection front portion 11$a$1 and a first connection rear portion 11$a$2. In some embodiments, the first connection units 15 have a first recess 151 at the first connection front portion 11$a$1 and a first protrusion 152 at the first connection rear portion 11$a$2. Alternatively, in some embodiments, the first connection units 15 have a second protrusion 153 at the first connection front portion 11$a$1 and a second recess 154 at the first connection rear portion 11$a$2 (as shown in FIG. 9).

The second optical-fiber adapter 2 comprises a second adapter body 21, and four side walls of the second adapter body 21 define a second receiving cavity 22. Two ends of the second adapter body 21 have second insertion openings 23 in communication with the second receiving cavity 22. A first side wall 21$a$ of the second adapter body 21 has a plurality of second connection units 25. The second side wall 21$a$ of the second adapter body 21 comprises a second connection front portion 21$a$1 and a second connection rear portion 21$a$2. In some embodiments, the second connection units 25 have a third protrusion 251 at the second connection front portion 21$a$1 and a third recess 252 at the second connection rear portion 21$a$2. Alternatively, in some embodiments, the second connection units 25 have a fourth recess 253 at the second connection front portion 21$a$1 and a fourth protrusion 254 at the second connection rear portion 21$a$2 (as shown in FIG. 9).

Figure 4:
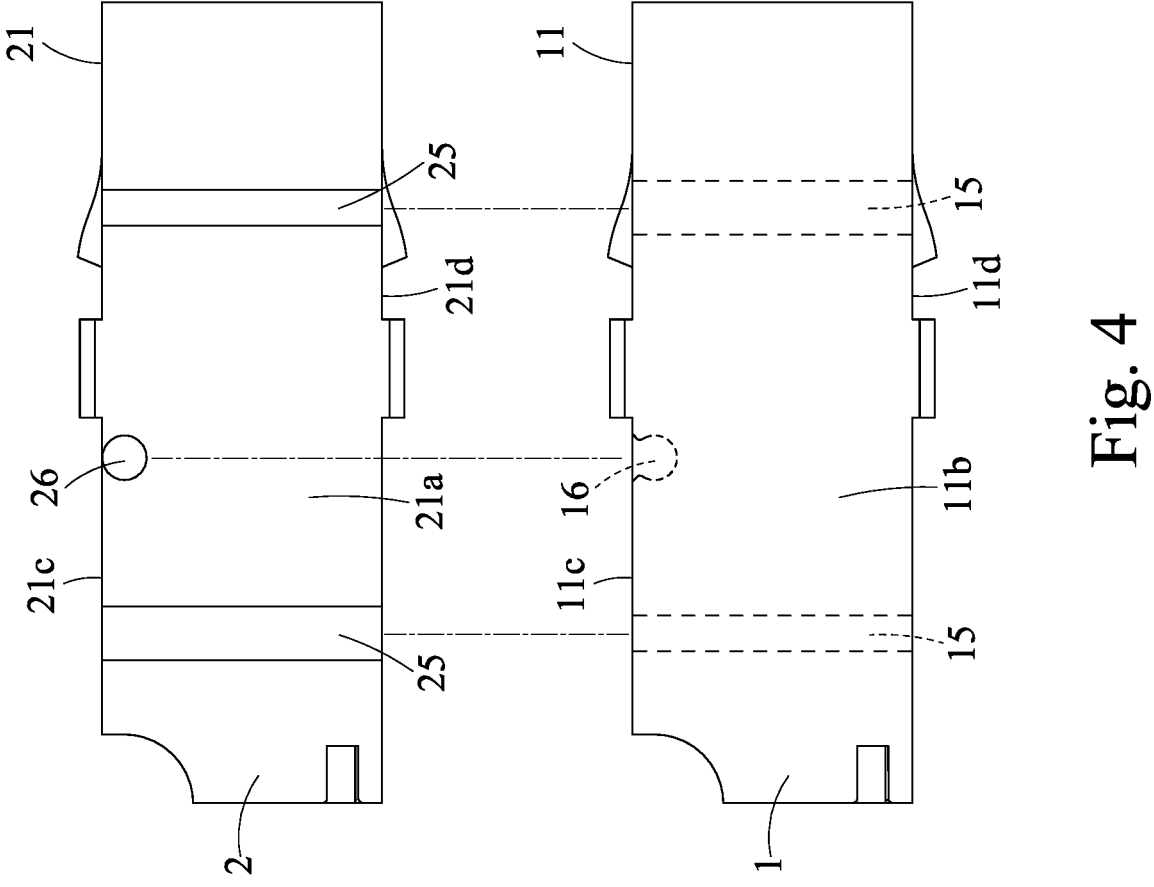
FIG. 4 illustrates an assembled side view of the optical-fiber adapter assembly according to some embodiments of the instant disclosure, where the first engaging portion is above the first side wall of the first adapter body, and the second engaging portion is above the first side wall of the second adapter body.

Please refer to FIG. 3 and FIG. 4. FIG. 3 illustrates an exploded view of the optical-fiber adapter assembly. FIG. 4 illustrates an assembled side view of the optical-fiber adapter assembly. In some embodiments, the first side wall 11$a$ of the first adapter body 11 has a first engaging portion 16, and the first side wall 21$a$ of the second adapter body 21 has a second engaging portion 26. The first engaging portion 16 is above the first side wall 11$a$ of the first adapter body 11, and the second engaging portion 26 is above the first side wall 21$a$ of the second adapter body 21.

Please refer to FIG. 1 to FIG. 3. In some embodiments, the first recess 151 at the first connection front portion 11$a$1 of the first adapter body 11 is docked with the third protrusion 251 at the second connection front portion 21$a$1 of the second adapter body 21 which is adjacent to the first recess 151 in a one-to-one manner, and the first protrusion 152 at the first connection rear portion 11$a$2 of the first adapter body 11 is docked with the third recess 252 at the second connection rear portion 21$a$2 of the second adapter body 21 which is adjacent to the first protrusion 152 in a one-to-one manner, so that the first adapter body 11 and the second adapter body 21 adjacent to the first adapter body 11 are assembled with each other side-by-side. Or, the second protrusion 153 at the first connection front portion 11$a$1 of the first adapter body 11 is docked with the fourth recess 253 at the second connection front portion 21a1 of the second adapter body 21 which is adjacent to the second protrusion 153 in a one-to-one manner, and the second recess 154 at the first connection rear portion 11a2 of the first adapter body 11 is docked with the fourth protrusion 254 at the second connection rear portion 21a2 of the second adapter body 21 which is adjacent to the second recess 154 in a one-to-one manner, so that the first adapter body 11 and the second adapter body 21 adjacent to the first adapter body 11 are assembled with each other side-by-side (as shown in FIG. 9).

Please refer to FIG. 1 to FIG. 3. In some embodiments, a width of the first recess 151 is greater than or substantially equal to a width of the third protrusion 251, and a width of the first protrusion 152 is less than or substantially equal to a width of the third recess 252. A width of the second protrusion 153 is less than or substantially equal to a width of the fourth recess 253, and a width of the second recess 154 is greater than or substantially equal to a width of the fourth protrusion 254.

Please refer to FIG. 1 to FIG. 3. In some embodiments, through docking the two first connection units 15 at a front portion and a rear portion of the first adapter body 11 with the corresponding two second connection units 25 at a front portion and a rear portion of the second adapter body 21, respectively, unsuitable mating between the two adapter bodies can be prevented, so that the first connection unit 15 (such as the first recess 151) at the front portion of the first adapter body 11 cannot be docked with the second connection unit 25 (such as the third recess 252) at the rear portion of the second adapter body 21, and the first connection unit 15 (such as the first protrusion 152) at the rear portion of the first adapter body 11 cannot be docked with the second connection unit (such as the third protrusion 251) at the front portion of the second adapter body 21.

Figure 6:
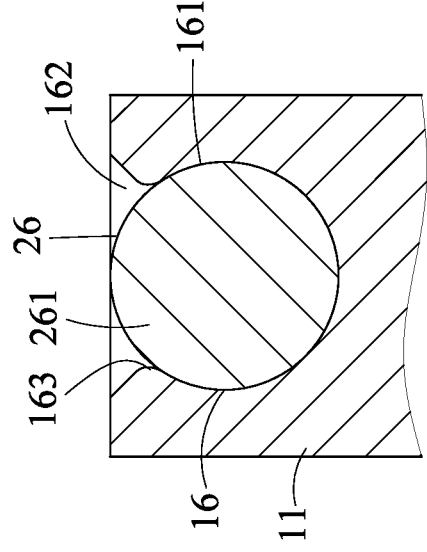
FIG. 6 illustrates an enlarged assembled view of the first engaging portion and the second engaging portion according to some embodiments of the instant disclosure.
Figure 5:
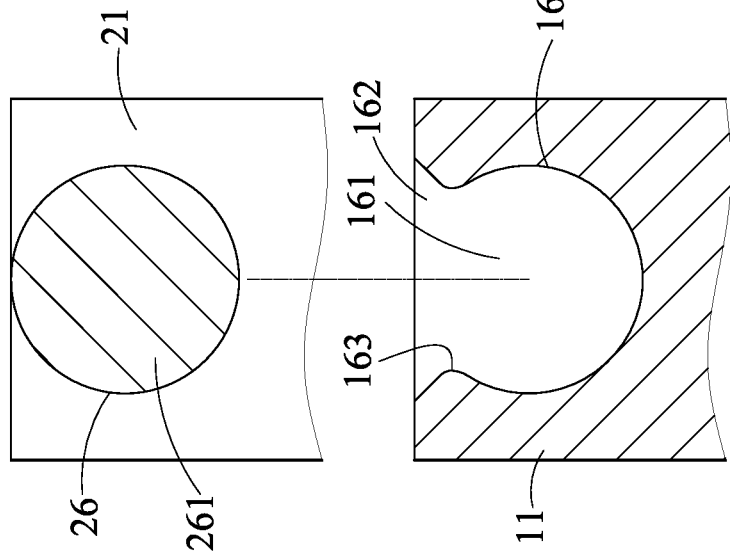
FIG. 5 illustrates an enlarged assembled view of the first engaging portion and the second engaging portion according to some embodiments of the instant disclosure.
Figure 7:
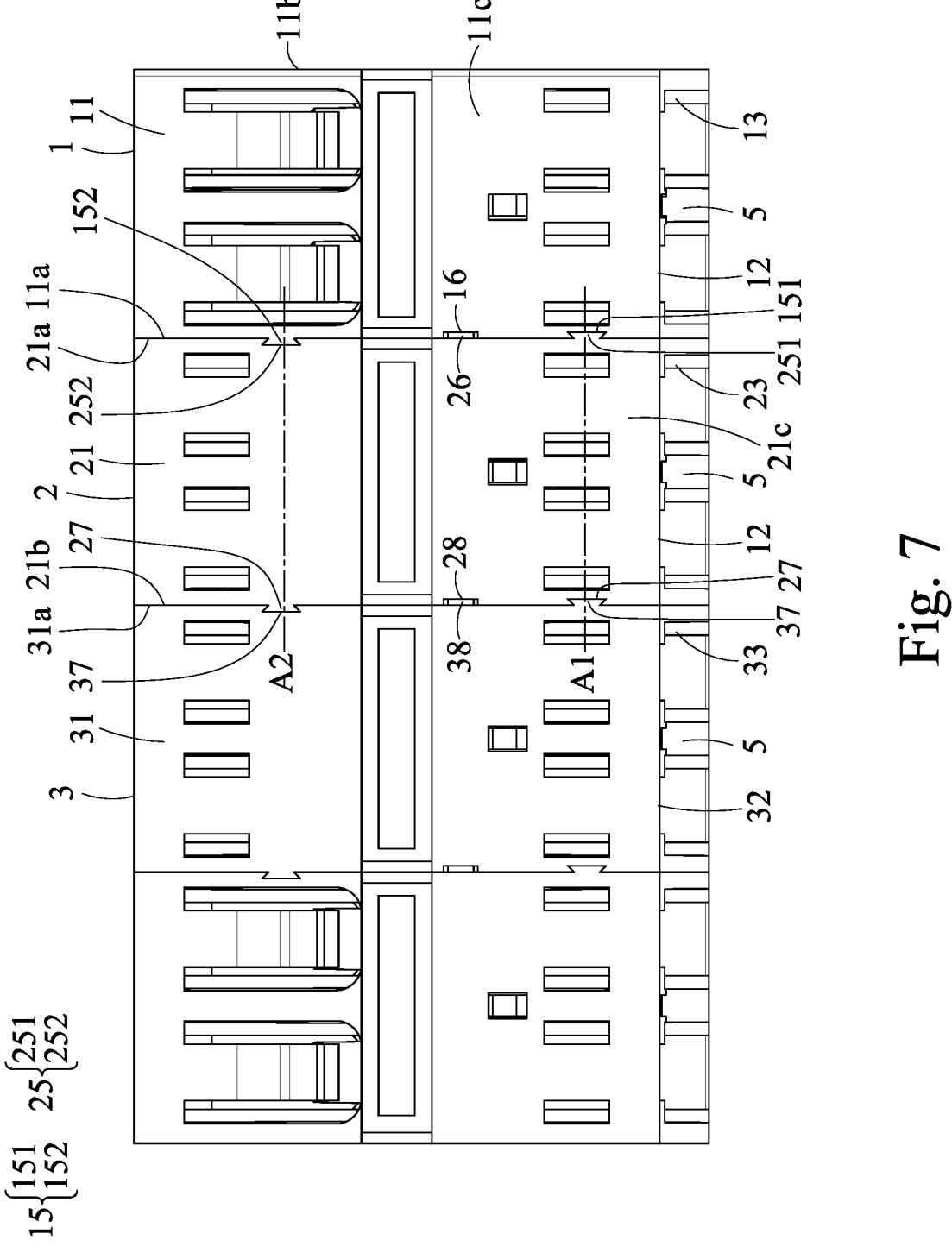
FIG. 7 illustrates a top view of the optical-fiber adapter assembly according to some embodiments of the instant disclosure, where the first recess at the first connection front portion is mated with the third protrusion at the second connection front portion, and the first protrusion at the first connection rear portion is mated with the third recess at the second connection rear portion.

When the first optical-fiber adapter 1 is assembled with the second optical-fiber adapter 2, the first side wall 11a of the first optical-fiber adapter 1 is assembled with the first side wall 21a of the second optical-fiber adapter 2, so that the first connection units 15 of the first adapter body 11 are respectively assembled with the second connection units 25 of the second adapter body 21 in a direction from bottom to top (as shown in FIG. 4). Therefore, the first engaging portion 16 is assembled and positioned with the second engaging portion 26 in the direction from bottom to top (as shown in FIG. 5 and FIG. 6), and thus the first optical-fiber adapter 1 and the second optical-fiber adapter 2 are assembled with each other to form a combinable optical-fiber adapter assembly (as shown in FIG. 7). Accordingly, several optical-fiber adapters can be interconnected with each other, thereby the number of the insertion holes for the connectors can increased, thereby increasing the applicability of the optical-fiber adapter assembly.

Please refer to FIG. 1 to FIG. 3. In some embodiments, the first connection unit on the front portion of the outer side surface of the first adapter body 11 is docked with the second connection unit 25 on the front portion of the outer side surface of the second adapter body 21 which is adjacent to the first adapter body 11 in a one-to-one manner, and the first connection unit 15 on the rear portion of the outer side surface of the first adapter body 11 is docked with the second connection unit 25 on the rear portion of the outer side surface of the second adapter body 21 which is adjacent to the first adapter body 11 in a one-to-one manner, so that two adjacent optical-fiber adapters can be assembled with each other side-by-side, and the two first connection units are respectively docked with the two second connection units. Therefore, the optical-fiber adapters can be aligned with each other to provide a uniform appearance.

Please refer to FIG. 1 to FIG. 3. In some embodiments, two ends of the first optical-fiber adapter 1 have a first inserting end 131 and a first assembling end 132. The first inserting end 131 is adapted to be inserted by a first optical-fiber cable, and the first assembling end 132 extends toward a terminal device. The first connection front portion 11a1 is connected to the first inserting end 131, and the first connection rear portion 11a2 is connected to the first assembling end 132. Two ends of the second optical-fiber adapter 2 have a second inserting end 231 and a second assembling end 232. The second inserting end 231 is adapted to be inserted by a second optical-fiber cable, and the second assembling end 232 extends toward the terminal device. The second connection front portion 21a1 is connected to the second inserting end 231, and the second connection rear portion 21a2 is connected to the second assembling end 232.

Please refer to FIG. 1 to FIG. 3. In some embodiments, the four side walls of the first adapter body 11 are respectively the first side wall 11a, a second side wall 11b, a first blocking wall 11c, and a first combining base wall 11d. The first side wall 11a and the second side wall 11b of the first adapter body 11 respectively extend from two sides of the first combining base wall 11d toward a same direction away from the first combining base wall 11d, the first blocking wall 11c is connected to the first side wall 11a and the second side wall 11b, and the first blocking wall 11c is spaced apart from the first combining base wall 11d.

Please refer to FIG. 1 to FIG. 3. In some embodiments, the four side walls of the second adapter body 21 are respectively are the first side wall 21a, a second side wall 21b, a second blocking wall 21c, and a second combining base wall 21d. The first side wall 21a and the second side wall 21b of the second adapter body 21 respectively extend from two sides of the second combining base wall 21d toward a same direction away from the second combining base wall 21d, the second blocking wall 21c is connected to the first side wall 21a and the second side wall 21b, and the second blocking wall 21c is spaced apart from the second combining base wall 21d.

Please refer to FIG. 3. In some embodiments, the first adapter body 11 and the second adapter body 21 are hollowed rectangular bodies. The first adapter body 11 and the second adapter body 21 are manufactured by injection molding techniques and are respectively formed as a one-piece member. The first adapter body 11 and the second adapter body 21 have rigid structures and improved structural strength.

Please refer to FIG. 3. In some embodiments, base assemblies 5 are disposed in the first receiving cavity 12 and the second receiving cavity 22. Therefore, the first receiving cavity 12 is divided into two cavities (in some embodiments, the base assembly 5 is absent and the first receiving cavity 12 is still a single cavity). Likewise, the second receiving cavity 22 is divided into two cavities (in some embodiments, the base assembly 5 is absent and the second receiving cavity is still a single cavity). Two ends of the first adapter body 11 may further comprise a plurality of first insertion openings 13, and two ends of the second adapter body may further comprise a plurality of second insertion openings 23. The number of the first insertion openings 13 and the second insertion openings 23 may be four, eight, sixteen, thirty two, or the like. Therefore, several optical-fiber connectors can be respectively inserted into the first insertion openings 13 and the second insertion openings 23.

Please refer to FIG. 3 and FIG. 4. In some embodiments, the first connection unit 15 and the second connection unit 25 are concave and convex structures mated with each other; the first connection unit 15 is a ducktail groove, and the second connection unit 25 is a ducktail protrusion, but the instant disclosure is not limited thereto. In some embodiments, the first connection unit 15 is a ducktail protrusion, and the second connection unit 25 is a ducktail groove. In some embodiments, the first connection unit 15 and the second connection unit 25 are T-shaped or gourd-shaped concave and convex structures mated with each other. After each of the first connection units 15 is assembled with a corresponding one of the second connection units 25, the optical-fiber adapters can be prevented from being detached from each other easily when the side portion of the optical-fiber adapters are subjected to a force.

Please refer to FIG. 3 and FIG. 4. In some embodiments, the first connection unit 15 and the second connection unit 25 are structures with rails, so that the first connection unit 15 and the second connection unit 25 are slidably assembled and engaged with each other, but the instant disclosure is not limited thereto. In some embodiments, the first connection unit 15 and the second connection unit 25 are engaged with each other in an interference fit manner.

Please refer to FIG. 5 and FIG. 6. In some embodiments, the first engaging portion 16 and the second engaging portion 26 are concave and convex structures mated with each other. In some embodiments, the first engaging portion 16 is a groove (which may be round, square, or of other geometrical shapes), the second engaging portion 26 is a protruding block (which may be round, square, or of other geometrical shapes), but the instant disclosure is not limited thereto. In some embodiments, the first engaging portion 16 is a protruding block, and the second engaging portion 26 is a groove. In some embodiments, the first engaging portion 16 has a groove 161 and an insertion hole 162, each of two sides of the insertion hole 162 has a buckling portion 163, the second engaging portion 26 has a protruding block 261, the protruding block 261 is engaged with the groove 161 through the insertion hole 162, and each of the buckling portions 163 contacts the protruding block 261 and is limited by the protruding block 261. Therefore, the first engaging portion 16 is engaged with the second engaging portion 26, and the first adapter body 11 can be positioned with the second adapter body 21. When the first engaging portion 16 is to be detached from the second engaging portion 26, the user can apply a force to detach the first adapter body 11 from the second adapter body 21, so that the first engaging portion 16 can be detached from the second engaging portion 26.

Please refer to FIG. 1 and FIG. 3. In some embodiments, the insertion direction I of the first receiving cavity 12 for the insertion of the optical-fiber connector(s) is the same as the insertion direction I of the second receiving cavity 22 for the insertion of the optical-fiber connector(s). Each of the first connection units 15 is on the first side wall 11a of the first adapter body 11 along an axial direction, and the axial direction is perpendicular to the insertion direction I of the first receiving cavity 12. Each of the second connection units 25 is on the first side wall 21a of the second adapter body 21, and the axial direction is perpendicular to the insertion direction I of the second receiving cavity 22.

Please refer to FIG. 3 and FIG. 4. In some embodiments, each of the first connection units 15 is an elongated slide groove, each of the first connection units 15 extends from a side portion of the first blocking wall 11c of the first adapter body 11 toward a side portion of the first combining base wall 11d of the first adapter body 11, each of the second connection units 25 is an elongated slide block, each of the second connection units 25 extends from a side portion of the second blocking wall 21c of the second adapter body 21 toward a side portion of the second combining base wall 21d of the second adapter body 21. In some embodiments, the first connection unit 15 may be a slide block, and the second connection unit 25 may be a slide groove. In some embodiments, the widths at any portion inside the elongated slide groove are identical, and the widths at any portion of the elongated slide block are identical. In some embodiments, an end portion of the opening of the elongated slide groove has an increased width and is provided with a chamfer structure, and an end portion of the elongated slide block has a reduced width and is provided with a chamfer structure, so that the elongated slide groove can be docked with the elongated slide block properly.

Please refer to FIG. 3 and FIG. 4. In some embodiments, the first connection units 15 are on two side portions of the first side wall 11a of the first adapter body 11, and the first engaging portion 16 is between the first connection units 15, but the instant disclosure is not limited thereto. In some embodiments, the first engaging portion 16 may be at a portion of the first side wall 11a of the first adapter body 11 and not between the first connection units 15. The second connection units 25 are on two side portions of the first side wall 21a of the second adapter body 21, and the second engaging portion 26 is between the second connection units 25, but the instant disclosure is not limited thereto. In some embodiments, the second engaging portion 26 may be at a portion of the first side wall 21a of the second adapter body 21 and not between the second connection units 25.

When the optical-fiber adapters of the combinable optical-fiber adapter assembly are respectively inserted by optical-fiber connectors and optical-fiber cables, the gravity of the optical-fiber cables pull the optical-fiber adapters downward, and thus the downward pulling force is applied to the optical-fiber adapters. Therefore, according to some embodiments, through the fixation between the first connection units 15 and the second connection units 25 and the fixation between the first engaging portion 16 and the second engaging portion 26, the connecting side walls of the optical-fiber adapters do not detach from each other by the downward pulling force of the optical-fiber cables.

In some embodiments, after the first engaging portion 16 is assembled with the second engaging portion 26, a panel member is covered above the optical-fiber adapter for fixation, so that the first engaging portion 16 and the second engaging portion 26 can be prevented from being detached from each other.

Please refer to FIG. 3 and FIG. 4. In some embodiments, the first engaging portion 16 is between the first connection units 15 and is adjacent to one of the first connection units 15, and the second engaging portion 26 is between the second connection units 25 and is adjacent to one of the second connection units 25. When the first optical-fiber adapter 1 is assembled with the second optical-fiber adapter 2, the first connection units 15 of the first adapter body 11 are respectively assembled with the second connection units 25 of the second adapter body 21 in a direction from bottom to top. Therefore, the first engaging portion 16 is assembled and positioned with the second engaging portion 26 in the direction from bottom to top. The first engaging portion 16 and the second engaging portion 26 have foolproof functions, so that the first engaging portion 16 can be prevented from being assembled with the second engaging portion 26 in the wrong direction (the direction from top to bottom).

Therefore, after the first engaging portion 16 and the second engaging portion 26 are assembled and positioned with each other, the first blocking wall 11c of the first adapter body 11 is flush with the second blocking wall 21c of the second adapter body 21, and the first combining base wall 11d of the first adapter body 11 is flush with the second combining base wall 21d of the second adapter body 21.

Please refer to FIG. 4. In some embodiments, the first engaging portion 16 is between the first side wall 11a of the first adapter body 11 and the first blocking wall 11c of the first adapter body 11, and the second engaging portion 26 is between the first side wall 121a of the second adapter body 21 and the second blocking wall 21c of the second adapter body 21, but the instant disclosure is not limited thereto.

Figure 8:
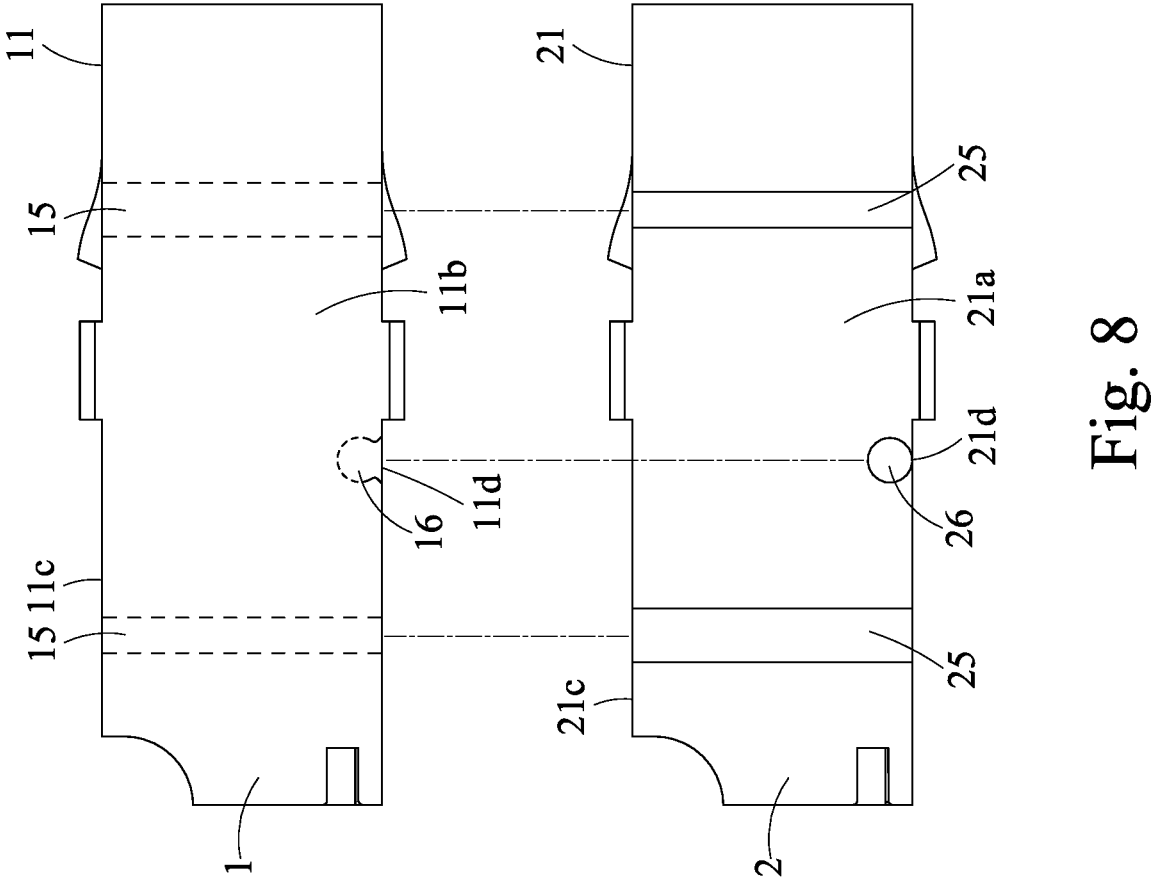
FIG. 8 illustrates an assembled side view of the optical-fiber adapter assembly according to some embodiments of the instant disclosure, where the first engaging portion is below the first side wall of the first adapter body, and the second engaging portion is below the first side wall of the second adapter body.

Please refer to FIG. 3 and FIG. 8. FIG. 8 illustrates an assembled side view of the optical-fiber adapter assembly according to some embodiments of the instant disclosure, where the first engaging portion 16 is below the first side wall 11a of the first adapter body 11, and the second engaging portion 26 is below the first side wall 21a of the second adapter body 21. In some embodiments, the first engaging portion 16 is between the first side wall 11a of the first adapter body 11 and the first combining base wall 11d of the first adapter body 11, and the second engaging portion 26 is between the first side wall 21a of the second adapter body 21 and the second combining base wall 21d of the second adapter body 21.

Please refer to FIG. 1 and FIG. 3. In some embodiments, for describing the structure by interconnecting several optical-fiber adapters, in the following descriptions, two optical-fiber adapters (the second optical-fiber adapter 2 and the third optical-fiber adapter 3) are provided as an illustrative example, but the instant disclosure is not limited thereto. In some embodiments, six, eight, twelve, etc. optical-fiber adapters may be provided and assembled with each other. In some embodiments, the second side wall 21b of the second adapter body 21 and the first side wall 21a of the second adapter body 21 of the second optical-fiber adapter 2 are symmetrically arranged at two sides of the second adapter body 21. The second side wall 21b of the second adapter body 21 has a plurality of third connection units 27 and a third engaging portion 28.

The combinable optical-fiber adapter assembly further comprises a third optical-fiber adapter 3, the third optical-fiber adapter 3 comprises a third adapter body 31, four side walls of the third adapter body 31 define a third receiving cavity 32, two ends of the third adapter body 31 have third insertion openings 33 in communication with the third receiving cavity 32, and a first side wall 31a of the third adapter body 31 has a plurality of fourth connection units 37 and a fourth engaging portion 38. Each of the third connection units 27 is assembled with a corresponding one of the fourth connection units 37, and the third engaging portion 28 is assembled with the fourth engaging portion 38.

Please refer to FIG. 1, FIG. 3, and FIG. 7. In some embodiments, the second connection units 25 at a front portion and a rear portion of the first side wall 21a of the second adapter body 21 respectively correspond to the third connection units 27 at a front portion and a rear portion of the second side wall 21b of the second adapter body 21. The second connection unit 25 at the front portion of the first side wall 21a and the third connection unit 27 at the front portion of the second side wall 21b are arranged on the same first axial line A1, and the second connection unit 25 at the rear portion of the first side wall 21a and the third connection unit 27 at the rear portion of the second side wall 21b are arranged on the same second axial line A2. The first axial line A1 and the second axial line A2 are lines arranged along a same horizontal direction.

Figure 10:
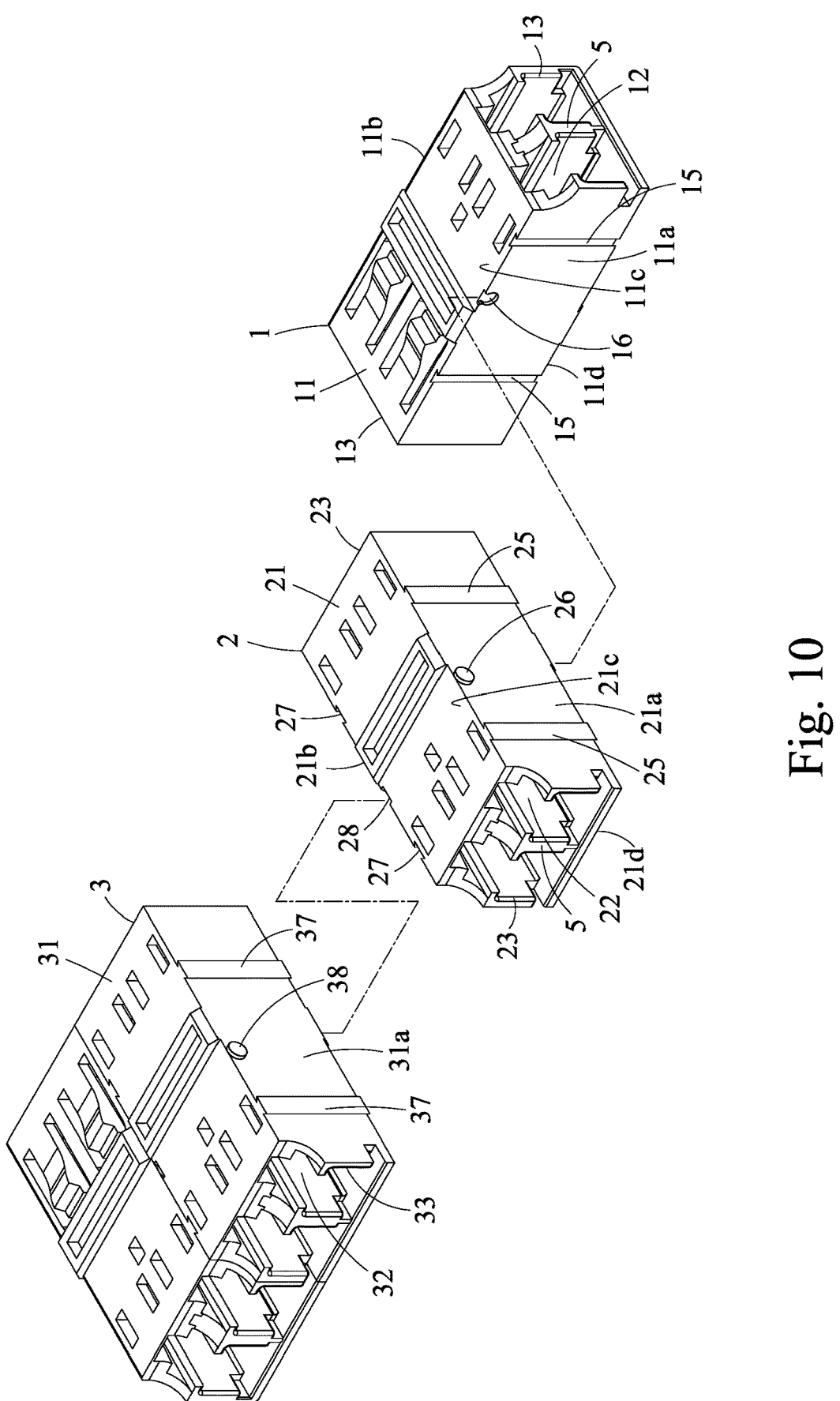
FIG. 10 illustrates an exploded view of the optical-fiber adapter assembly according to some embodiments of the instant disclosure, where each of the first connection units is a recess, and each of the second connection units is a protrusion.

Please refer to FIG. 10. FIG. 10 illustrates an exploded view of the optical-fiber adapter assembly according to some embodiments of the instant disclosure. In some embodiments, the optical-fiber adapter assembly comprises a first optical-fiber adapter 1 and a second optical-fiber adapter 2. The first optical-fiber adapter 1 comprises a first adapter body 11, and four side walls of the first adapter body 11 define a first receiving cavity 12. Two ends of the first adapter body 11 have first insertion openings 13 in communication with the first receiving cavity 12. The first side wall 11a of the first adapter body 11 has a plurality of first connection units 15 and a first engaging portion 16. The second optical-fiber adapter 2 comprises a second adapter body 21, and four side walls of the second adapter body 21 define a second receiving cavity 22. Two ends of the second adapter body 21 have second insertion openings 23 in communication with the second receiving cavity 22. The first side wall 21a of the second adapter body 21 has a plurality of second connection units 25 and a second engaging portion 26. Each of the first connection units 15 is assembled with a corresponding one of the second connection units 25, and the first engaging portion 16 is assembled with the second engaging portion 26. Each of the first connection units 15 is a recess structure, and each of the second connection units 25 is a protrusion structure.

According to some embodiments of the instant disclosure, the first connection unit on the front portion of the outer side surface of the first adapter body is docked with the second connection unit on the front portion of the outer side surface of the second adapter body which is adjacent to the first adapter body in a one-to-one manner, and the first connection unit on the rear portion of the outer side surface of the first adapter body is docked with the second connection unit on the rear portion of the outer side surface of the second adapter body which is adjacent to the first adapter body in a one-to-one manner, so that two adjacent optical-fiber adapters can be assembled with each other side-by-side, and the two first connection units are respectively docked with the two second connection units, thereby preventing the first connection unit on the front portion of the outer side surface of the first adapter body from being docked with the second connection unit on the rear portion of the outer side surface of the second adapter body which is adjacent to the first adapter body, and preventing the first connection unit on the rear portion of the outer side surface of the first adapter body from being docked with the second connection unit on the front portion of the outer side surface of the second adapter body which is adjacent to the first adapter body. By arranging several optical-fiber adapters side by side and interconnecting the optical-fiber adapters with each other, the optical-fiber adapters allow the insertion of several optical-fiber connectors, so that the adapters can provide flexible layout configurations for the optical-fiber cables. According to some embodiments, through the fixation between the first connection units and the second connection units and the fixation between the first engaging portion and the second engaging portion, the connecting side walls of the optical-fiber adapters do not detach from each other by the downward pulling force of the optical-fiber cables.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A combinable optical-fiber adapter assembly, comprising:

a first optical-fiber adapter comprising a first adapter body, wherein four side walls of the first adapter body define a first receiving cavity, two ends of the first adapter body have first insertion openings in communication with the first receiving cavity, a first side wall of the first adapter body has a plurality of first connection units, and the first side wall of the first adapter body comprises a first connection front portion and a first connection rear portion; the first connection units have a first recess at the first connection front portion and a first protrusion at the first connection rear portion, or the first connection units have a second protrusion at the first connection front portion and a second recess at the first connection rear portion; and a second optical-fiber adapter comprising a second adapter body, wherein four side walls of the second adapter body define a second receiving cavity, two ends of the second adapter body have second insertion openings in communication with the second receiving cavity, a first side wall of the second adapter body has a plurality of second connection units, and the first side wall of the second adapter body comprises a second connection front portion and a second connection rear portion; the second connection units have a third protrusion at the second connection front portion and a third recess at the second connection rear portion, or the second connection units have a fourth recess at the second connection front portion and a fourth protrusion at the second connection rear portion;

wherein the first recess at the first connection front portion of the first adapter body is docked with the third protrusion at the second connection front portion of the second adapter body which is adjacent to the first recess in a one-to-one manner, and the first protrusion at the first connection rear portion of the first adapter body is docked with the third recess at the second connection rear portion of the second adapter body which is adjacent to the first protrusion in a one-to-one manner, so that the first adapter body and the second adapter body adjacent to the first adapter body are assembled with each other side-by-side; or wherein the second protrusion at the first connection front portion of the first adapter body is docked with the fourth recess at the second connection front portion of the second adapter body which is adjacent to the second protrusion in a one-to-one manner, and the second recess at the first connection rear portion of the first adapter body is docked with the fourth protrusion at the second connection rear portion of the second adapter body which is adjacent to the second recess in a one-to-one manner, so that the first adapter body and the second adapter body adjacent to the first adapter body are assembled with each other side-by-side;

wherein the first side wall of the first adapter body has a first engaging portion, the first side wall of the second adapter body has a second engaging portion, and the first engaging portion is assembled with the second engaging portion;

the first engaging portion has a groove and an insertion hole, each of two sides of the insertion hole has a buckling portion, the second engaging portion has a protruding block, the protruding block is engaged with the groove through the insertion hole, and each of the buckling portions contacts the protruding block and is limited by the protruding block.

2. The combinable optical-fiber adapter assembly according to claim 1, wherein each of the first connection units is on the first side wall of the first adapter body along an axial direction, the axial direction is perpendicular to an insertion direction of the first receiving cavity, each of the second connection units is on the first side wall of the second adapter body along the axial direction, and the axial direction is perpendicular to an insertion direction of the second receiving cavity.

3. The combinable optical-fiber adapter assembly according to claim 1, wherein the first connection units extend from a side portion of a first blocking wall of the first adapter body to a side portion of a first combining base wall of the first adapter body, and the second connection units extend from a side portion of a second blocking wall of the second adapter body to a side portion of a second combining base wall of the second adapter body.

4. The combinable optical-fiber adapter assembly according to claim 3, wherein the first blocking wall of the first adapter body is flush with the second blocking wall of the second adapter body, and a first combining base wall of the first adapter body is flush with a second combining base wall of the second adapter body.

5. The combinable optical-fiber adapter assembly according to claim 1, wherein the first connection units are on two side portions of the first side wall of the first adapter body, the first engaging portion is between the first connection units, the second connection units are on two side portions of the first side wall of the second adapter body, and the second engaging portion is between the second connection units.

6. The combinable optical-fiber adapter assembly according to claim 5, wherein the first engaging portion is adjacent to one of the first connection units, and the second engaging portion is adjacent to one of the second connection units.

7. The combinable optical-fiber adapter assembly according to claim 1, wherein the first engaging portion is between the first side wall of the first adapter body and the first blocking wall of the first adapter body, and the second engaging portion is between the first side wall of the second adapter body and the second blocking wall of the second adapter body.

8. The combinable optical-fiber adapter assembly according to claim 1, wherein the first engaging portion is between the first side wall of the first adapter body and a first combining base wall of the first adapter body, and the second engaging portion is between the first side wall of the second adapter body and a second combining base wall of the second adapter body.

9. The combinable optical-fiber adapter assembly according to claim 1, wherein a second side wall of the second adapter body and the first side wall of the second adapter body are symmetrically arranged at two sides of the second adapter body, the second side wall of the second adapter body has a plurality of third connection units and a third engaging portion; the combinable optical-fiber adapter assembly further comprises a third optical-fiber adapter, the third optical-fiber adapter comprises a third adapter body, four side walls of the third adapter body define a third receiving cavity, two ends of the third adapter body have third insertion openings in communication with the third receiving cavity, and a first side wall of the third adapter body has a plurality of fourth connection units and a fourth engaging portion; each of the third connection units is assembled with a corresponding one of the fourth connection units, and the third engaging portion is assembled with the fourth engaging portion.

10. The combinable optical-fiber adapter assembly according to claim 9, wherein the second connection units at a front portion and a rear portion of the first side wall of the second adapter body respectively correspond to the third connection units at a front portion and a rear portion of the second side wall of the second adapter body.

11. The combinable optical-fiber adapter assembly according to claim 1, wherein two ends of the first optical-fiber adapter have a first inserting end and a first assembling end, the first connection front portion is connected to the first inserting end, the first connection rear portion is connected to the first assembling end, two ends of the second optical-fiber adapter have a second inserting end and a second assembling end, the second connection front portion is connected to the second inserting end, and the second connection rear portion is connected to the second assembling end.

12. The combinable optical-fiber adapter assembly according to claim 1, wherein the four side walls of the first adapter body are the first side wall, a second side wall, a first blocking wall, and a first combining base wall; the first side wall and the second side wall of the first adapter body respectively extend from two sides of the first combining base wall toward a same direction away from the first combining base wall, the first blocking wall is connected to the first side wall and the second side wall, and the first blocking wall is spaced apart from the first combining base wall.

13. The combinable optical-fiber adapter assembly according to claim 1, wherein the four side walls of the second adapter body are the first side wall, a second side wall, a second blocking wall, and a second combining base wall; the first side wall and the second side wall of the second adapter body respectively extend from two sides of the second combining base wall toward a same direction away from the second combining base wall, the second blocking wall is connected to the first side wall and the second side wall, and the second blocking wall is spaced apart from the second combining base wall.

14. The combinable optical-fiber adapter assembly according to claim 1, wherein a width of the first recess is greater than or equal to a width of the third protrusion, and a width of the first protrusion is less than or equal to a width of the third recess.

15. The combinable optical-fiber adapter assembly according to claim 1, wherein a width of the second protrusion is less than or equal to a width of the fourth recess, and a width of the second recess is greater than or equal to a width of the fourth protrusion.

16. A combinable optical-fiber adapter assembly, comprising:

a first optical-fiber adapter comprising a first adapter body, wherein four side walls of the first adapter body define a first receiving cavity, two ends of the first adapter body have first insertion openings in communication with the first receiving cavity, a first side wall of the first adapter body has a plurality of first connection units and a first engaging portion; and a second optical-fiber adapter comprising a second adapter body, wherein four side walls of the second adapter body define a second receiving cavity, two ends of the second adapter body have second insertion openings in communication with the second receiving cavity, a first side wall of the second adapter body has a plurality of second connection units and a second engaging portion, each of the first connection units is assembled with a corresponding one of the second connection units, and the first engaging portion is assembled with the second engaging portion, the first engaging portion has a groove and an insertion hole, each of two sides of the insertion hole has a buckling portion, the second engaging portion has a protruding block, the protruding block is engaged with the groove through the insertion hole, and each of the buckling portions contacts the protruding block and is limited by the protruding block.

\* \* \* \* \*